No. 710,757. Patented Oct. 7, 1902.
E. P. COLEMAN & S. E. HITT.
MECHANICAL BRAKE FOR HOISTING MACHINERY.
(Application filed Oct. 23, 1900.)

(No Model.) 6 Sheets—Sheet 1.

WITNESSES:
E. G. Staude
M. E. Gooley

INVENTORS
Edgar P. Coleman
Samuel E. Hitt
BY
Paul H. Hawley
ATTORNEYS

No. 710,757. Patented Oct. 7, 1902.
E. P. COLEMAN & S. E. HITT.
MECHANICAL BRAKE FOR HOISTING MACHINERY.
(Application filed Oct. 23, 1900.)
(No Model.) 6 Sheets—Sheet 2.

No. 710,757. Patented Oct. 7, 1902.
E. P. COLEMAN & S. E. HITT.
MECHANICAL BRAKE FOR HOISTING MACHINERY.
(Application filed Oct. 23, 1900.)

(No Model.) 6 Sheets—Sheet 3.

WITNESSES:

INVENTORS
EDGAR P. COLEMAN
SAMUEL E. HITT
BY
HIS ATTORNEYS

No. 710,757. Patented Oct. 7, 1902.
E. P. COLEMAN & S. E. HITT.
MECHANICAL BRAKE FOR HOISTING MACHINERY.
(Application filed Oct. 23, 1900.)
(No Model.) 6 Sheets—Sheet 6.

WITNESSES:
INVENTORS
Edgar P. Coleman,
Samuel E. Hitt,
BY
ATTORNEYS

THE NORRIS PETERS CO., PHOTO-LITHO., WASHINGTON, D. C.

UNITED STATES PATENT OFFICE.

EDGAR P. COLEMAN AND SAMUEL E. HITT, OF CHICAGO, ILLINOIS.

MECHANICAL BRAKE FOR HOISTING MACHINERY.

SPECIFICATION forming part of Letters Patent No. 710,757, dated October 7, 1902.

Application filed October 23, 1900. Serial No. 34,074. (No model.)

*To all whom it may concern:*

Be it known that we, EDGAR P. COLEMAN and SAMUEL E. HITT, of the city of Chicago, county of Cook, and State of Illinois, have invented certain new and useful Improvements in Mechanical Brakes for Hoisting Machinery, of which the following is a specification.

Our invention relates to hoisting machinery or other similar apparatus in which there is a tendency for the load to turn the driving mechanism or motor backward, and more particularly to improvements in mechanical brakes for jib, gauntree, or overhead traveling cranes operated by electric power.

Several forms of mechanical brakes are now in use on hoisting machinery. In some of these brakes the power-shaft is not continuous through the brake, being made in two sections that abut one another at some point within the brake. With this arrangement the outer bearings and the close fitting of the various parts of the brake are depended upon for alinement, with the result that as soon as the parts become at all worn the brake gets out of line and becomes inoperative. In a brake of this class one or more of the parts are liable to uneven and excessive wear, requiring frequent renewals. An objection to some brakes as now constructed is the employment of an external pawl and ratchet, which makes considerable noise when the brake sets. In the form of brake in which an exterior revolving drum is used it is difficult to make satisfactory arrangements for the introduction of oil to the interior of the drum. In this form of brake a band and lever-arm are sometimes used to prevent the drum from rotating when lowering, and such a brake is a source of danger to workmen, the breaking of the band or the lever-arm being frequent, after which the load cannot be controlled. In other forms of brakes small rollers or other loose pieces are used, and these get misplaced, particularly when repairs are being made, causing annoyance and delay. Again, most brakes jam or set so firmly in holding a load that it is very difficult to start them under load, an appreciable amount of power being consumed in this way instead of in lifting the load. A brake should be and our object is to construct a brake so that while it will set firmly it may yet be released by a very small surplus of power, and, further, a brake should be so constructed that when a load is being lowered the brake will then oppose sufficient resistance to prevent the motor from running away.

The general object of our invention is to provide a mechanical brake that is entirely self-contained and wherein the operations are all automatically positive and are not dependent upon springs, straps, or light external parts.

The particular objects of our invention are, first, to provide a brake that will allow the motor to hoist free—that is, by the expenditure of a minimum amount of power in overcoming the friction of a set brake; second, to provide a brake that will act automatically and hold the load fast at any point when not hoisting or lowering; third, to provide a brake that will lower automatically—that is, will keep the speed of lowering under control of the motor and, on the other hand, prevent the too rapid operation of the motor; fourth, to have a continuous shaft through the brake; fifth, to inclose all moving parts of the brake within a stationary casing readily accessible for oiling and repairs; sixth, to have an oil-tight casing of large capacity requiring only occasional filling; seventh, to provide a brake that cannot possibly be broken with ordinary usage; eighth, to prevent uneven wearing of the parts, and, ninth, to run silently.

Our invention consists generally in a mechanical brake comprising a stationary casing or friction member in combination with a load-shaft or load-coupling, a driving-shaft, revoluble friction members mounted upon said shaft, pressure-exerting means in conjunction with said revoluble friction members, said pressure-exerting means being normally operated by the load-shaft to apply revoluble members forcibly to said stationary friction member and said driving-shaft being capable of slight independent movement with respect to said revoluble members and provided with means thereby rendered operable to either wholly or partially relieve said revoluble members from pressure.

Our invention further consists in various constructions and combinations of parts, all as hereinafter described, and particularly pointed out in the claims.

The invention will be more readily understood by reference to the accompanying drawings, forming part of this specification, and in which—

Hoisting machinery is generally equipped with two brakes, which may respectively and properly be designated as the "motor-brake" and the "automatic mechanical" brake. The motor-brake exerts little if any braking action on the mechanism carrying the weight or load, its function being almost solely that of overcoming the momentum of the moving parts of the motor and to bring them quickly to rest when required. Such a motor-brake is conveniently operated or controlled by the motive power or otherwise, so that it tends to bring the motor quickly to rest when the power is shut off. With our invention some convenient form of motor-brake will generally be required as an auxiliary, although not necessarily so. Otherwise it does not concern our invention. The principal functions of the automatic mechanical brake are to hold the load fast when not hoisting or lowering and to automatically and efficiently brake the hoisting mechanism when lowering the weight or load. It is not required, nor would it be advisable, to make a brake that would in any way take the control of the load from the operator of the motor; but rather the object is to control the load solely through the medium or motion of the motor's driving-shaft, the motor being under the direct control of the operator. In our brake the direct opposition to backward movement is greater at the motor end than at the load end, so that the load end is the first to release.

A complete understanding of the detailed construction of our device will be facilitated by a brief description of its operation, as follows: For the operation of hoisting, the motor-shaft turns in the direction which we will call "forward," releasing the brake and at the same instant forming a direct connection or positive drive with the hoisting-shaft. When the motor stops, the load descends a distance (which may be made as small as desired) and sets the brake. When it is desired to lower the weight or load, the motor is caused to turn in a backward direction, releasing the brake, in which case either of two conditions may exist—viz., if the load is so light that its downward pull is insufficient to overcome the friction of the hoist mechanism, the motor-shaft in its backward rotation will first entirely release the brake, then continuing its rotation through a small additional angle will engage or come in contact with the hoisting shaft or axle, thus forming a direct connection or positive drive to lower the weight. On the other hand, if the load is sufficiently heavy to overcome the friction of the hoist mechanism when the brake is released the action is as follows: The motor in its backward rotation exerts a sufficient torque to partly release the brake, allowing the load to fall an infinitesimal distance, after which its motion is again arrested by the brake. The motor-shaft, continuing its rotation, again releases the brake, allowing the load to fall another infinitesimal distance, and so on successively. The result is a continuous lowering of the load corresponding to the continuous rotation of the motor. The torque exerted by the motor is just sufficient to partly release the brake to an extent corresponding to a power which is in practice a small percentage of the kinetic energy due to the lowering-head. The load is thus automatically and with certainty held in check, the rate of lowering being controlled by the operator and the motor being automatically checked by the resistance of the backward-turning friction members.

Referring now to the drawings in detail, 1 represents the stationary casing provided with the flaring base 2, by which it is bolted or otherwise fastened to the frame or bed of the hoisting mechanism. The casing is preferably cylindrical, and the ends thereof are closed by the casing-heads 3 and 4, securely bolted thereto. The driving-shaft 5 and the hoisting shaft or coupling 6 extend through the heads 3 and 4, which, however, do not necessarily form bearings for said shafts, outside bearings being usually provided for the driving-shaft 5. The shaft 6 is a sleeve upon the shaft 5, the latter extending entirely through the brake mechanism. The heads 3 and 4 are preferably provided with packing-glands 7 and 8. These prevent the escape of oil from the casing and allow the casing to be filled with oil up to the level of the shaft 5 or above it, if desired. The inner surfaces 3' 4' of the heads 3 and 4 form the stationary friction-surfaces of the mechanism. These stationary friction surfaces or members are engaged by the revoluble friction members or heads that are provided within the casing, said movable or revoluble members taking the form of heads or disks 9 and 10, which are mounted upon the shaft 5. The disk or head 9 has a frictional engagement with the stationary head 3 through the medium of a series of alternately stationary and revoluble friction-disks 11 and 12, arranged between the parts 3 and 9. The stationary disks 11 are held against rotation by lugs 11' thereon, which extend into longitudinal grooves 13 in the walls of the casing 1, said grooves permitting the easy insertion of the disks and also permitting slight longitudinal movement thereof within the casing. The revoluble disks 12 are similarly attached or coupled to the friction member 9 by inwardly-extending lugs 12', projecting into longitudinal grooves 14 in the boss 15, that is provided upon said friction head or member 9. The revoluble friction member 10 engages the head 4 directly and is either integral with or is attached to the coupling or hoisting-shaft 6.

The connection between the driving-shaft 5 and the hoisting-shaft 6 is made by means of the hoisting-pin 16, the ends of which project from the shaft 5 into segmental slots 17, provided in the sleeve-shaft 6 or the member 10. It is obvious that when the shaft 5 is rotated the ends of the pins 16 will engage the ends or shoulders of the slots 17, and thus rotate the shaft 6. This rotation of the shaft 6 and the revolving friction member 10 is communicated to the friction member 9 through the medium of a clutch or coupling arranged between the parts 9 and 10. This coupling permits a slight relative rotation of the part 9 with respect to the part 10, and vice versa; but when the shaft 6 is driven by the shaft 5 the part 9 must always follow and rotate therewith also. The power is communicated to the load through the pinion 18, that is keyed to the hoisting-shaft or coupling 6. The load exerts a backward-turning force upon said pinion 18 in opposition to the force of the motor upon the shaft 5. When the hoisting-shaft is being driven by the shaft 5 to raise a load, it is necessary that said shafts 5 and 6 shall, so far as possible, be relieved from the frictional resistance of the heads 9 and 10 bearing upon the stationary friction members of the brake. On the contrary, when the motor and the shaft 5 are stopped and when the load causes the pinion 18 and the shaft 6 to turn backwardly or in a reverse direction it is necessary that the heads 9 and 10 shall be tightly clamped against the stationary friction surface or member, to the end that the load may be held suspended. Then when it is desired to lower the load it will obviously be necessary that means be provided whereby a backward turning or reverse effort of the shaft 5 will decrease the pressure of the revoluble friction members 9 and 10 upon the stationary members, so that the hoisting-shaft may rotate backwardly and permit the load to fall gradually. To secure these results, we employ, instead of a simple clutch between the parts 9 and 10, a pressure-coupling or pressure-exerting means capable of positive actuation or operation either by the driving-shaft 5 or by the hoisting-shaft 6, the office of said means being to force the revoluble members into engagement with the stationary friction members when a backward-turning effort is exerted upon the hoisting-shaft 6, while at the same time said pressure-coupling admits of the relief of pressure upon the friction members by the rotating of the driving-shaft. As illustrated in Figs. 3 to 23, our pressure-coupling comprises corresponding spiral cams 19 and 20 upon the friction members 9 and 10, respectively. A pair of cams are preferably employed upon each part, and the longitudinal portions of said cams form opposing jaws 21 and 22 upon the parts 9 and 10, which jaws are positively engaged when the part 10 is picked up by the pin 16 on the shaft 5 and rotated. The spiral cams each have a projection of one hundred and eighty degrees, so that if the same are rotated in the direction that they would move if longitudinal pressure was exerted thereon the jaws 21 and 22 of the cams will be brought together. On the other hand, if one cam is rotated in a contrary direction to that in which pressure would move the same then the jaws will be opened or spread apart and the opposing spirals or inclined cams will tend to rise one upon the other, thereby thrusting the two portions of the pressure-coupling apart and in consequence strongly pressing the movable friction members 9 and 10 against the stationary friction members. The degree of separation that is possible between the jaws 21 and 22 of the pressure-coupling is determined by the looseness of the parts between the heads 3 and 4—that is, the difference between the length of the stationary part of the brake and the length of all of the friction members upon the shaft 5. In practice the movable parts within the casing, plus the stationary disks 11, are made to fit very snugly between the ends or heads 3 and 4 of the casing, with the result that a longitudinal separation of the parts 9 and 10 to the extent of a very small fraction of an inch will cause great friction between the rotary and the stationary parts of the device. This being the case, it is evident that but a very slight relative movement between the portions of the pressure-coupling occuring in either part thereof is all that is required to either place stress and heavy pressure upon the friction members or leave them in contact only, in which latter condition, owing to perfect lubrication, there will be practically no resistance to the rotation of the driving-shaft 5. To maintain the disks or members 9 and 10 in the condition of contact with the stationary portions of the mechanism, we prefer to interpose a pressure-spring 24 between the parts 9 and 10. In conjunction therewith an antitorsion-washer 25 may be employed, ball-bearings being provided between the washer and the head 10, if desired.

From the foregoing it will be understood that the friction member 9 has no power of communicating pressure through rotation to the opposite member, and it will also be understood that such pressure is exerted only through the member 10 and the hoisting-shaft 6 and only when the load tends to turn said shaft 6 backward—that is, if the driving-shaft is stationary the pressure device will be automatically actuated by the load to force the parts 9 and 10 apart, such actuation of the pressure coupling or device being the result of a small degree of rotation imparted to the shaft 6 by a short fall of the load. On the other hand, when the load is to be hoisted the pressure device is relieved of stress by the positive picking up of the shaft 6 by the strong pin or lug 16 of the shaft 5, and when the shaft 6 is positively rotated the jaws of the pressure-coupling portion belonging thereto in turn pick the jaws of the opposite coupling portion and the member 9. If it were alone necessary to thus positively free the movable portions of the brake from the stationary members thereof and then upon the stopping of the motor or driving-shaft 5 cause the brake to act and exert friction in excess of the weight of the load, it would be unnecessary to provide for any relative movement of the driving-shaft with relation to the hoisting-shaft, and said parts might be integral one with the other and the member 10; but in order that the load may be allowed to fall it is necessary to provide means somewhere between the driving-shaft and the pressure-coupling, whereby one part of the latter may be positively reversed and slightly rotated with respect to the other part to decrease the pressure upon the brake members 9 and 10. Now it will be evident from an inspection of Figs. 3 to 6 that a reverse rotation of that part of the pressure-coupling which is attached to the member 10 would only tighten the brake, and so it becomes necessary to provide for the positive reverse rotation of the member 9 or of the portion of the coupling that is associated therewith, and to accomplish this the driving-shaft 5 is provided with another cross pin or key 26, which extends into slots 27 in the central portion of the member 9 to engage the same when the motor and the driving-shaft are reversed. The slots 17 and 27 in the two parts of the coupling are made necessary by the fact that while the brake is set it is practically impossible to reverse the direction of the member 10 through engagement of the pin 16 therewith. Hence the slot 17 is made sufficiently long, so that the pin 16 is never permitted to engage the part 10 when the shaft 5 is reversed, such reverse movement being utilized to actuate the member 9 and impart thereto a movement that is shorter than either of the slots 17 or 27 and which relative movement is limited by the jaws 21 and 22, which, however, are brought together only on the positive rotation of the shaft or at a time when the load is so light that it will not impart reverse rotation to the pinion 18, in which case it is necessary to relieve the friction of the brake entirely and positively lower the load through the medium of the pressure-coupling. The slots 17 and 27 in the two parts of the pressure-coupling or in parts associated therewith are arranged with considerable lap, so that after the load has been allowed to fall by the progressive lessening of the friction due to the lead of the part 9 with respect to the part 10 and the cam-surfaces the shaft 5 may be again rotated in a positive direction and after a short independent rotation will remove the pin 26 from engagement with the part 9, leaving the same substantially in the middle of the slot 27 at the moment that the pin 16 engages the end of its slot 17 in the part 10. The pin 26 never engages the part 9 during the positive rotation of the shaft to hoist. If the pin did so engage the part 9, it is evident that the pressure-coupling would be twisted or operated to force the friction members 9 and 10 apart, which would result in frictional resistance to the hoist and would be most objectionable.

Figure 1:
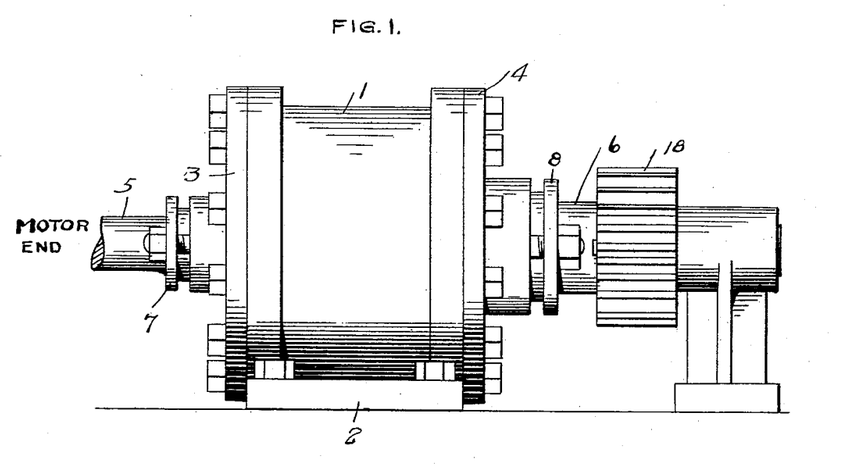
Figure 1 is a side elevation of a mechanical brake embodying our invention.
Figure 2:
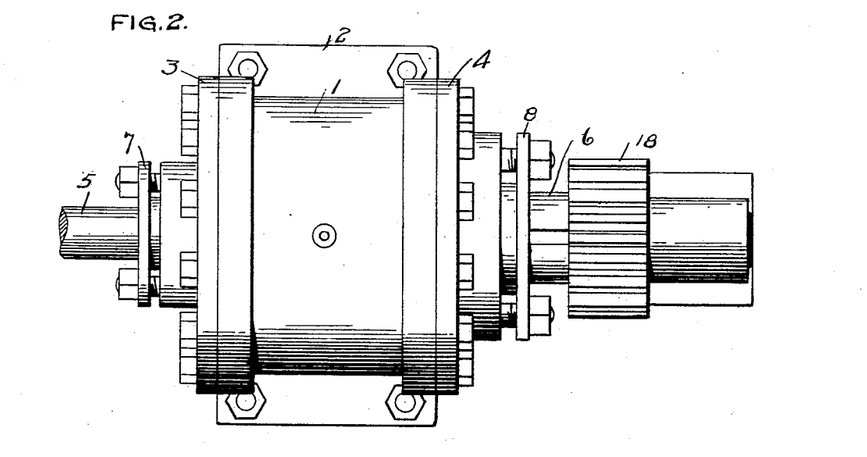
Fig. 2 is a plan view thereof.
Figure 3:
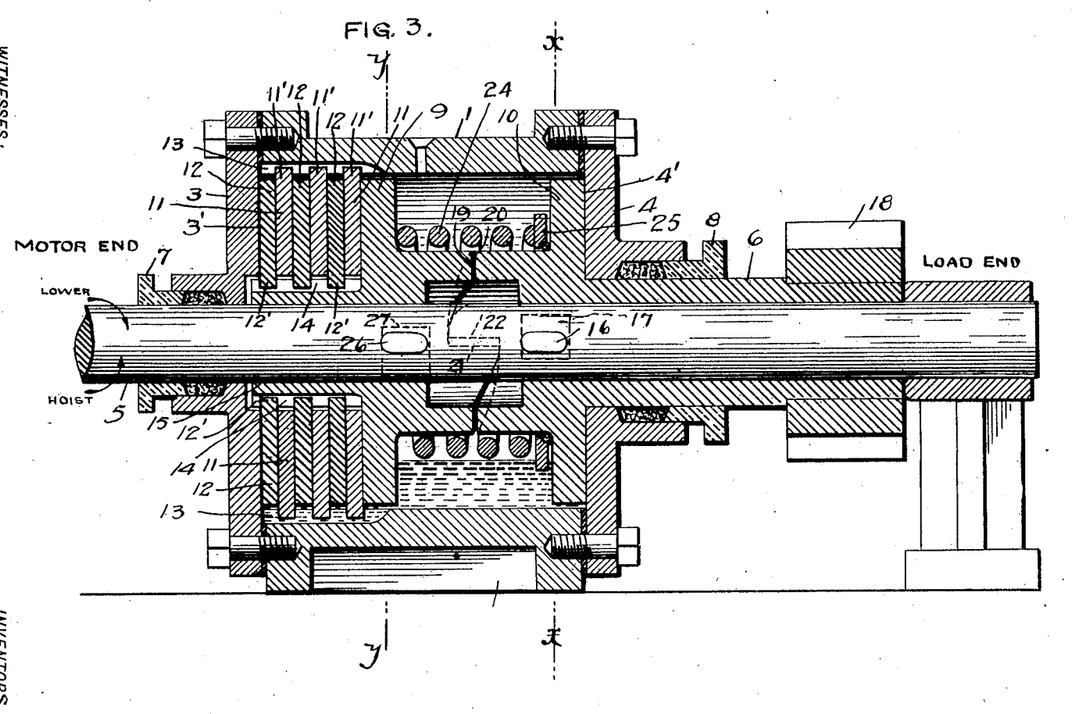
Fig. 3 is an enlarged vertical and longitudinal section of the device.
Figures 4, 16, 17, 18, 19:
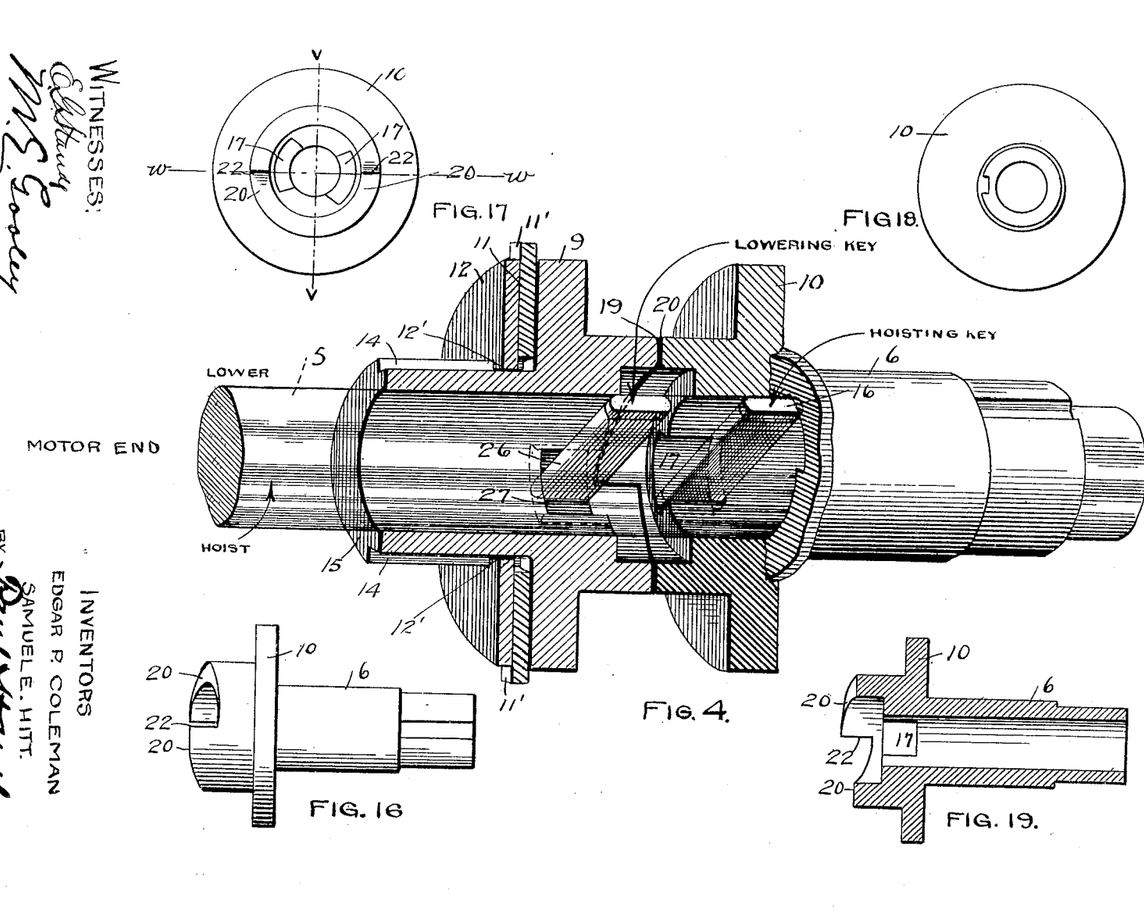
Figs. 4, 5, and 6 are perspective sectional views illustrating the operation of the driving-shaft, the friction members, and the pressure-exerting means.
Fig. 16 is a side elevation of the load-end head or friction member.
Fig. 17 is an end view of the same as seen from the motor end.
Fig. 18 is an end view of the same as seen from the load end.
Fig. 19 is a longitudinal section through the line $v\ v$ of Fig. 17.
Figures 5, 20, 21, 22:
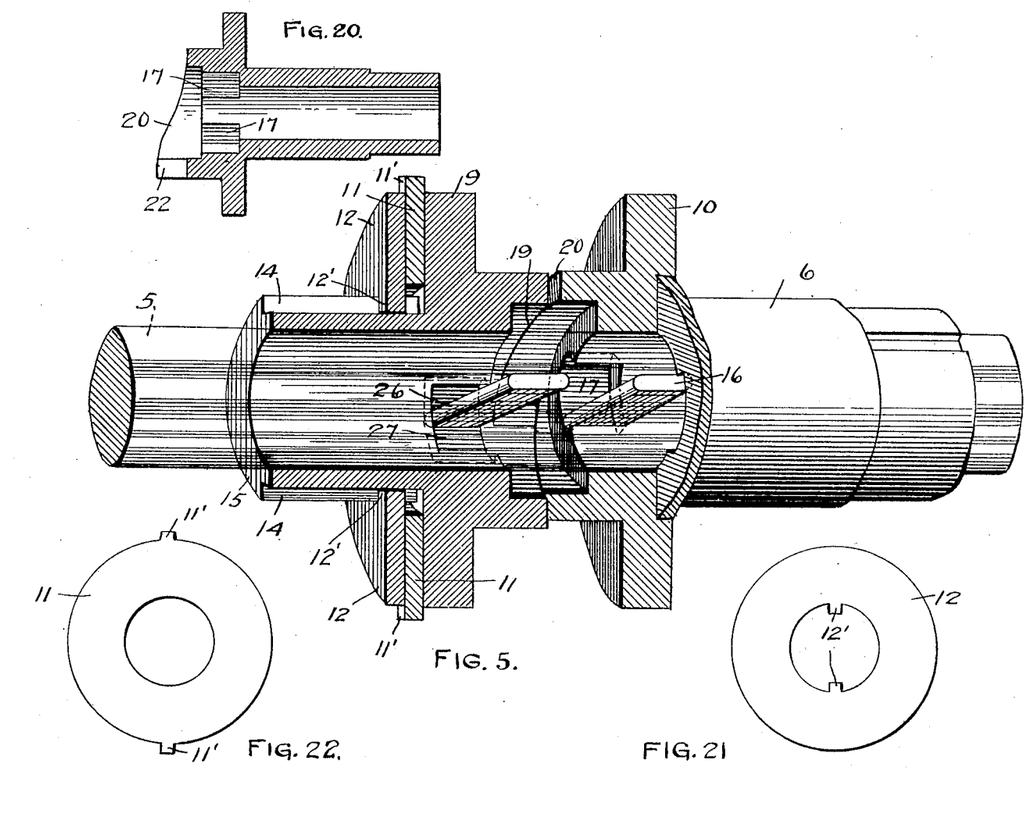
Fig. 20 is a longitudinal section through the line $w\ w$ of Fig. 17.
Fig. 21 is a side elevation of a friction-disk with inside tongue.
Fig. 22 is a side elevation of a friction-disk with outside tongue.
Figures 6, 11, 12, 13, 14, 15:
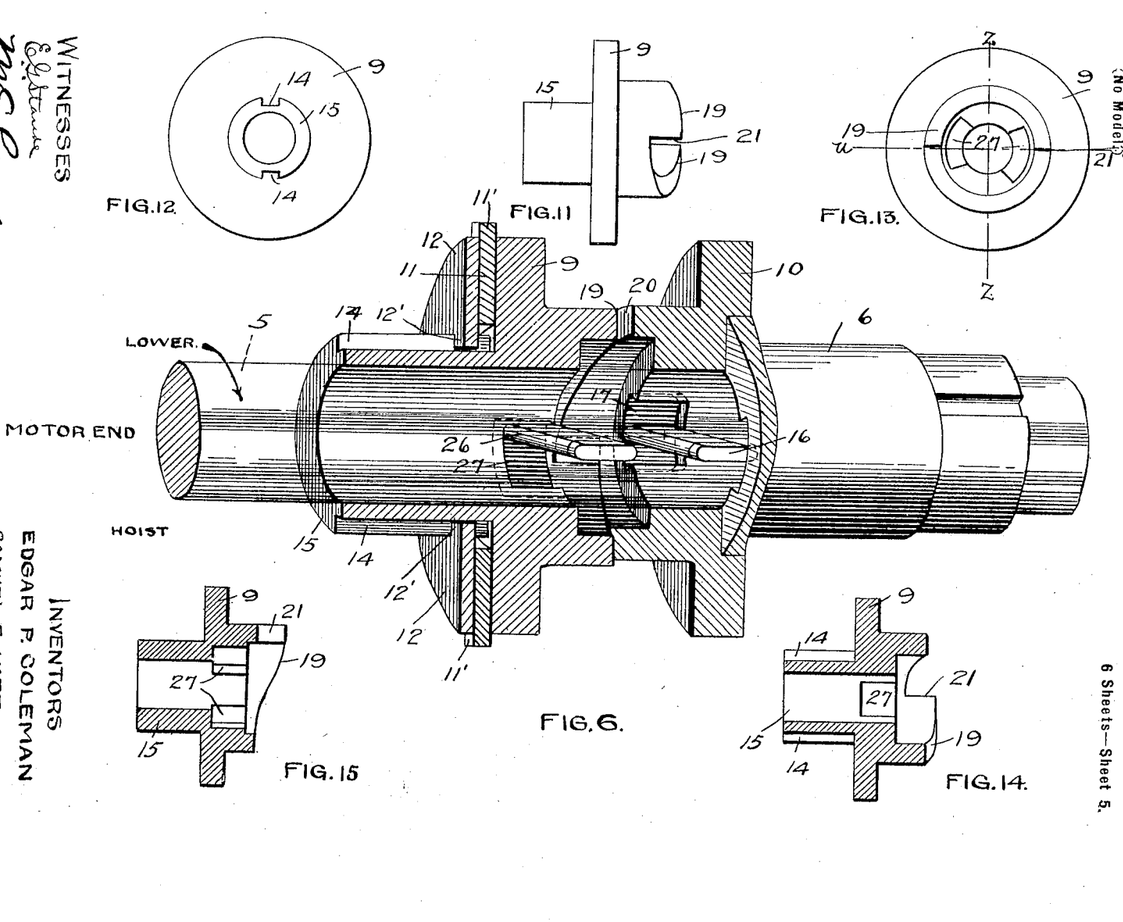
Fig. 11 is a side elevation of the motor-end friction member or head.
Fig. 12 is an end view of the same as seen from the motor end.
Fig. 13 is an end view as seen from the load end.
Fig. 14 is a longitudinal section of the head on the line $z\ z$ of Fig. 13.
Fig. 15 is a longitudinal section on the line $u\ u$ of Fig. 13.
Figure 7:
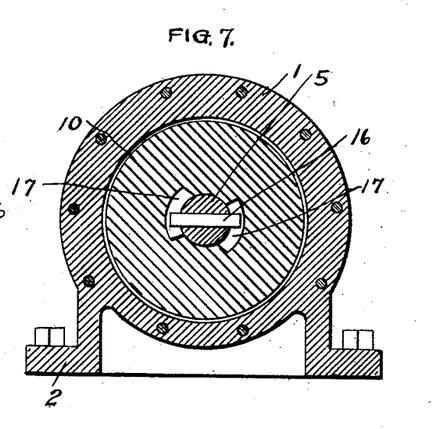
Fig. 7 is a transverse section on the line $x\ x$ of Fig. 3.
Figure 8:
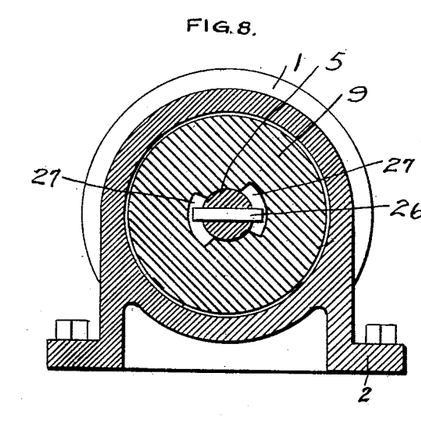
Fig. 8 is a similar view on line $y\ y$ of Fig. 3.
Figure 9:
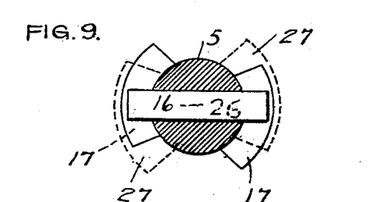
Fig. 9 is a diagram showing the projection of the slot of Fig. 7 upon the slot of Fig. 8.
Figure 10:
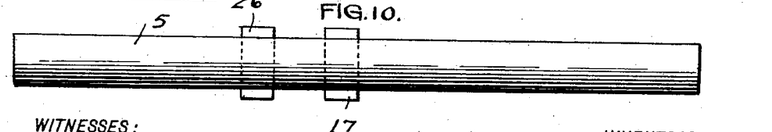
Fig. 10 is a plan view of the brake or driving shaft.
Figure 23:
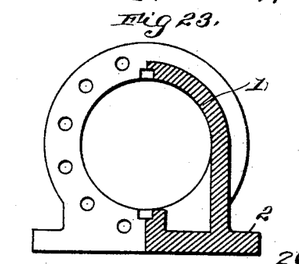
Fig. 23 is an end view in half-section of the stationary casing.

The operation of the driving-shaft, the pins or keys 16 and 26, and of the pressure-coupling, and the relative positions of the pin-slots in the coupling are well shown in Figs. 4, 5, and 6. Fig. 4 illustrates the mechanism as it appears at the moment of hoisting, the pin 16 being engaged with the member 10, the pin 26 being free from engagement with its corresponding member 9, and the jaws 21 and 22 being shown in engagement, with the brake members collapsed and the part 10 driving the part 9. Fig. 5 shows the position of the parts at the moment after the driving-shaft has been stopped and when because of the backward rotation of the hoisting-shaft 6 the part 10 has been rearwardly rotated with respect to the part 9, actuating the pressure device to separate or force apart the two members 9 and 10. It may be here noted that the part 10 is sure to rotate with respect to the part 9 at this time, for the reason that the friction upon the part 9 and its disks 12 is greater than the friction between the part 10 and the head 4 of the casing. The shaft 5 is turned backwardly a short distance, likewise the pins 16 and 26, by the backward rotation of the shaft 6, which at the time is in engagement with the pin 16. Hence the variance of angles in the pins, as shown in Figs. 4 and 5. Fig. 6 shows the mechanism as it appears at the moment after the shaft 5 has been reversed and when the pin or key 26 has been brought into engagement with the end of the slot 27, and hence the part 9, after which the rotation of the shaft 5 will cause downward or relief movement of the pressure-cams, which downward movement will continue until the friction member 10 begins to follow the friction member 9, owing to a reduction in the resistance of the brake and the backward-turning force of the falling load. The short independent reverse rotation of the shaft 5 prior to the picking up of the movable brake members is well illustrated by a comparison of Figs. 5 and 6 and the change in the angular positions of the pins or keys in the shaft 5.

The essence of our invention resides in the construction and assemblage of the parts in such manner that the reverse rotation of the driving-shaft after an initial independent movement tends easily to partially relieve or wholly relieve friction and wholly relieves friction when the driving-shaft is rotated positively.

Another essential feature of our invention resides in the stationary casing or friction member with relation to which the other brake members are revoluble while under the positive control of the driving-shaft.

There are many other important features of our invention which will be understood from the foregoing, and all of these features may be retained in similar though specifically different structures not herein shown and described, and we therefore do not confine our invention to the specific appliances and constructions herein illustrated.

We have described and claimed two other mechanical brakes in our pending applications filed November 21, 1901, and having respective Serial Nos. 83,179 and 83,180, the subject-matter of which originally appeared in this application.

Having thus described our invention, we claim as new and desire to secure by Letters Patent—

1. In an automatic mechanical brake, the combination of a stationary friction member with a driving-shaft extending therethrough, revoluble friction members mounted upon said shaft, said revoluble members being of different frictional capacity, a load-shaft revoluble upon said driving-shaft and connected with the friction member having the least frictional capacity, a cam or pressure device interposed between said revoluble members and said driving-shaft having means for operating said cam device to wholly relieve the stress thereof when the driving-shaft is rotated forwardly, and either partially or wholly relieve said stress when the driving-shaft is reversed, substantially as described.

2. In an automatic brake, the combination of a stationary friction member with two revoluble friction members, a load-shaft connected with one of said members, a pressure or cam device interposed between said revoluble members and operable through the medium of said load-shaft to force them into engagement with the stationary member, a driving-shaft extending through said stationary and revoluble friction members and through said load-shaft and a pick-up device or key provided on said driving-shaft for actuating said pressure or cam device, substantially as described.

3. In an automatic mechanical brake, the combination with the stationary casing having friction-head ends, of the revoluble friction members arranged within said casing, said members being of different frictional capacities and being operable upon opposite heads of said casing, the load-shaft extending into said casing and connected with the revoluble member of least capacity, the abutting spiral cams provided upon said friction members, the driving-shaft extending through said casing, said members and said load-shaft, and means upon said driving-shaft permitting a slight independent movement thereof with relation to said members and load-shaft, and adapted to engage and operate said load-shaft and members, substantially as described.

4. In an automatic mechanical brake, the combination with the stationary casing provided with friction-heads, of the friction-disks provided in said casing and of different frictional capacities, a driving-shaft whereon said disks are mounted, a load-shaft connected with the disk of least capacity, a pressure-coupling connected with said load-shaft and said disks, a pick-up device provided upon said driving-shaft and adapted to engage said pressure means and the disk of greatest capacity upon the forward and backward rotation, respectively, of said driving-shaft, substantially as described.

5. In an automatic mechanical brake, the combination with the stationary casing provided with friction-heads, of the friction-disks provided in said casing and of different frictional capacities, a driving-shaft whereon said disks are mounted a load-shaft connected with the disk of least capacity, a pressure-coupling connected with said load-shaft and said disks, a pick-up device provided upon said driving-shaft and adapted to engage said load-shaft and the disk of greatest capacity upon the forward and backward rotation, respectively, of said driving-shaft, substantially as described.

6. In an automatic mechanical brake, the combination with the stationary casing having friction-heads, of the driving-shaft extending therethrough, friction-heads arranged upon said driving-shaft within said casing and being of different frictional capacities, a load-shaft arranged upon said driving-shaft and extending into said casing and connected with the disk of least capacity, pressure-cams interposed between said friction-disks and having jaws 21 and 22, said disks having overlapping slots 17 and 27 and means upon said driving-shaft extending into said slots whereby the disk of least capacity is engaged upon the positive operation of the driving-shaft and the disk of greatest capacity is engaged upon the rotation of said driving-shaft, substantially as described.

7. In an automatic mechanical brake, the combination with the stationary casing having friction-heads, of the driving-shaft extending therethrough, friction-heads arranged upon said driving-shaft within said casing and being of different frictional capacities, a distending-spring arranged between said disks, a load-shaft arranged upon said driving-shaft and extending into said casing and connected with the disk of least capacity, pressure-cams interposed between said friction-disks and having jaws 21 and 22, said disks having overlapping slots 17 and 27 and means upon said driving-shaft extending into said slots whereby the disk of least capacity is engaged upon the positive operation of the driving-shaft, and the disk of greatest capacity is engaged upon the reverse rotation of said driving-shaft, substantially as described.

8. In an automatic mechanical brake, the combination with the oil-tight casing having friction-heads and held stationary of the driving and load shafts extending through and into said casing, respectively, the friction-disks mounted upon said shafts, pressure means interposed between said disks and means provided in connection with said driving-shaft and disks whereby the frictional operation of said disks in both directions is controlled solely by said driving-shaft, substantially as described.

9. In an automatic mechanical brake, the combination with the stationary casing having friction-heads, of the driving-shaft extending through said casing, the friction members arranged in said casing and upon said shaft, the multiplying friction-disks interposed between one of said friction members and the opposed friction-head, a load-shaft mounted upon said driving-shaft and connected with the other friction member, the pressure-cams interposed between said friction members and the slot-and-pin connections between said driving-shaft and said members, whereby the operation of said members is controlled by said driving-shaft, substantially as described.

10. In an automatic mechanical brake, the combination with the opposed stationary friction-surfaces, of the driving-shaft, a load-shaft, friction-disks arranged upon said shafts, the spring 24 arranged between said disks and provided with an antitorsion-bearing thereon, a pressure device interposed between said disks and means provided upon one of said shafts for the operation of said pressure device to relieve the pressure thereof, wholly or partially, during the rotation of said driving-shaft in either direction, substantially as described.

11. In an automatic mechanical brake, the combination with the stationary casing, of the friction-disks of different frictional capacities provided therein, the spiral cam-pressure coupling arranged between said disks, a load-shaft connected with the disk of least capacity and with one part of said coupling, and the driving-shaft having a slot-and-pin connection with both parts of said coupling, said connections being relatively overlapped, whereby the rotation of said driving-shaft in a positive direction, operates the part of said coupling that is connected with the load-shaft to relieve said shaft from the friction of said disks, and whereby the rotation of the driving-shaft in a reverse direction, operates with the other part of said coupling to partially or wholly relieve the friction of said disks, substantially as described.

12. In an automatic mechanical brake, the combination of a stationary cylindrical casing provided with removable friction ends or heads, with a driving-shaft extending through said casing, friction members carried upon said shaft, pressure and controlling means also carried thereby, a load-shaft, and all of said parts being removable from said casing upon the removal of the ends thereof, substantially as described.

13. In an automatic mechanical brake, the combination of the casing 1, having friction-heads 3 and 4, with the friction-heads 9 and 10 arranged in said casing, the abutting spiral cams provided upon said disks 9 and 10, the load-shaft 6 connected with the disk 10, the multiplying friction-disks 11 and 12 arranged in said casing between the friction-disk 9 and the head 3, said disks 11 and 12 being held by and revoluble with said casing and disk 9, respectively, a driving-shaft extending through said casing and said load-shaft, and the slot-and-pin connections between said driving-shaft and said disks 9 and 10, substantially as described.

In testimony whereof we have hereunto set our hands this 15th day of October, 1900.

EDGAR P. COLEMAN.
SAMUEL E. HITT.

In presence of—
H. M. LETTON,
G. E. LINDERGREN.